US011887800B1

(12) United States Patent
Douglass et al.

(10) Patent No.: US 11,887,800 B1
(45) Date of Patent: Jan. 30, 2024

(54) WELDED COMPOSITE FUSE ELEMENT AND METHOD OF MANUFACTURE

(71) Applicant: EATON INTELLIGENT POWER LIMITED, Dublin (IE)

(72) Inventors: Robert Stephen Douglass, Wildwood, MO (US); Ankita Mehra, Hyderabad (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 17/865,719

(22) Filed: Jul. 15, 2022

(51) Int. Cl.
*H01H 85/38* (2006.01)
*H01H 69/02* (2006.01)
*H01H 85/00* (2006.01)

(52) U.S. Cl.
CPC ............ *H01H 85/38* (2013.01); *H01H 69/02* (2013.01); *H01H 85/0013* (2013.01); *Y10T 29/49107* (2015.01)

(58) Field of Classification Search
CPC .......... H02H 3/087; H02H 7/085; H02H 3/08; H01H 9/106; H01H 69/02; H01H 85/38; H01H 85/06; H01H 85/12; Y10T 137/8242; Y10T 29/49107
USPC ............... 29/623, 592.1, 825, 829, 874, 876
See application file for complete search history.

(56) References Cited

U.S. PATENT DOCUMENTS 4,488,137 A * 12/1984 Rooney ................ H01H 85/055 337/292
11,636,993 B2 * 4/2023 Douglass ............... H01H 69/02 29/623

* cited by examiner

*Primary Examiner* — Thiem D Phan
(74) *Attorney, Agent, or Firm* — Eckert Seamans Cherin & Mellott, LLC

(57) ABSTRACT

The disclosed concept relates generally to overlay composite fuse elements, materials for their construction that include copper and silver metals, and methods of production and fabrication using metal stamping and ultrasonic welding processes. In certain embodiments, a composite overlay fuse element includes a composite metal material 37 constructed of silver and copper metals, which includes a plurality of strain absorbing bend features 39 constructed of copper metal, and a plurality of arc interrupting weak spot features 43 constructed of a silver metal portion and a copper metal portion. The silver and copper metal portions on each of the plurality of arc interrupting weak spot features 43 are connected by a weld joint surface 45 that is structured to form an overlay of the silver and copper metal portions.

15 Claims, 9 Drawing Sheets

WELDED COMPOSITE FUSE ELEMENT AND METHOD OF MANUFACTURE

FIELD OF THE INVENTION

The disclosed concept relates generally to overlay composite fuse elements, materials for their construction that include copper and silver metals, and methods of production and fabrication using metal stamping and ultrasonic welding processes.

BACKGROUND OF THE INVENTION

Traditional power fuses use pure silver fuse elements to provide the best performance in the form of temperature response, time-current melting behavior, arc suppression, and life cycle fatigue resistance.

FIG. 1 is a schematic of a power fuse system 1 that includes a first terminal end bell 3, an opposing second terminal end bell 5, and a cylindrical fuse tube 7 extending from the first terminal end bell 3 to the second terminal end bell 5 forming an outer surface of the power fuse system 1. A first circuit connection terminal 9 is connected to the first terminal end bell 3, and a second circuit connection terminal 11 is connected to the second terminal end bell 5. Positioned inside of the fuse tube 7 is an arc quenching filler 13 and a fuse element 15. In conventional power fuse systems, the fuse element 15 is typically constructed of pure silver metal.

FIG. 2 is a detail view schematic of the fuse element 15 as shown in FIG. 1 wherein the construction includes a metal material 17 composed of pure silver metal material only. The pure silver metal material 17 includes strain absorbing bend features 19, e.g., folds, a fuse terminal connection tab 21, and arc interrupting weak-spot features 23.

Pure silver is a desired metal for the fabrication of fuse elements; although, the cost for silver is very expensive and therefore, reducing the amount of silver used in fabricating fuse elements can result in significant cost savings. It is known in the art to substitute copper metal for at least a portion of the silver metal to produce composite fuel elements. However, it has been found that the use of copper can result in a reduction of critical fuse performance areas.

FIG. 3A is a detail view schematic of the fuse element 15 as shown in FIG. 1 wherein the construction includes a composite metal material 27 composed of silver metal and copper metal materials. The silver and copper composite metal material 27 includes copper strain absorbing bend features 29, a copper fuse terminal connection tab 31, and silver arc interrupting weak-spot features 33. FIGS. 3B and 3C are detail view schematics of a braised joint 35 that connects each of the copper strain absorbing bend features 29 to the silver arc interrupting weak-spot features 33 as shown in FIG. 3A.

There is known in the art a braised composite of silver and copper metals that is used to fabricate fuse elements, and addresses the preservation of the desired performance of silver. However, the braised composite material is still very costly due to the presence of a significant amount of silver as compared to the small amount of copper used to produce the composite. In addition, specialized processes are typically used, e.g., required, in fabricating these braised composite elements.

Accordingly, there is a need in the art for new fuse elements, composite materials for their construction, and methods for production and fabrication. There is room for improvement in fuse elements to combat the high fabrication cost related to pure silver metal while preserving the desired performance of silver, and minimizing the fuse performance issues associated with a copper metal substitute material. In addition, there is room for improvement in using traditional metal foundry casting and rolling processes for producing and fabricating the fuse elements.

SUMMARY OF THE INVENTION

In one aspect, the disclosed concept includes a method of producing a silver and copper composite overlay fuse element. The method includes preparing a composite metal material 37 constructed of silver and copper metals, which includes forming a plurality of strain absorbing bend features 39 constructed of copper metal; and forming a plurality of arc interrupting weak spot features 43 constructed of a silver metal portion and a copper metal portion, wherein a weld joint forms an overlay of the silver and copper metal portions on each of the plurality of arc interrupting weak spot features 43; and connecting each of the plurality of arc interrupting weak spot features 43 to a corresponding one of the plurality of strain absorbing bend features 39.

In certain embodiments, the step of preparing the a plurality of arc interrupting weak spot features 43 includes obtaining a copper base lead-frame 49 having a top surface and a bottom surface; forming a plurality of initial open holes comprising indexing holes 51 and first weak spot relief holes 53, through the thickness of the copper base lead-frame 49; forming a plurality of ribbons 55 constructed of silver metal; applying the plurality of ribbons 55 onto the bottom surface of the copper base lead-frame 49 for covering the first weak spot relief holes 53; and subsequently forming a plurality of second weak spot relief holes 59 at least partially over the first weak spot relief holes 53.

The forming of the plurality of first weak spot relief holes 53 may be conducted by punching or puncturing through the copper base lead-frame 49.

In certain embodiments, applying the plurality of ribbons 55 includes welding over the first weak spot relief holes 53. The welding may be selected from resistance spot welding, laser spot welding, and laser seam welding.

The forming of the plurality of second weak spot relief holes 59 may include forming open holes through a silver and copper composite formed by the plurality of silver ribbons 55 that overlay portions of the copper base lead-frame 49.

The forming of the plurality of second weak spot relief holes 59 may be conducted by punching or puncturing through the silver and copper composite formed by the silver ribbons 55 overlaying portions of the copper base lead-frame 49.

In certain embodiments, the second weak spot relief holes 59 overlay portions of the copper base lead-frame 49 and the first weak spot relief holes 53.

A plurality of final weak spot relief holes 63 may be subsequently formed in the top surface 48 of the copper base lead-frame to partially overlay portions of the first and second weak spot relief holes 53, 59.

In another aspect, the disclosed concept includes a silver and copper composite overlay fuse element, which includes a composite metal material 37 constructed of silver and copper metals, including a plurality of strain absorbing bend features 39 constructed of copper metal; and a plurality of arc interrupting weak spot features 43 constructed of a silver metal portion and a copper metal portion which includes a weld joint that is structured to form an overlay of the silver and copper metal portions on each of the plurality of arc interrupting weak spot features 43, wherein the plurality of arc interrupting weak spot features 43 is connected to a corresponding one of the plurality of strain absorbing bend features 39.

In certain embodiments, the plurality of strain absorbing bend features 39 each comprises a sheet of copper metal.

In certain embodiments, the plurality of arc interrupting weak spot features 43, includes a copper base lead-frame 49 having a top surface and a bottom surface; a plurality of first weak spot relief holes 53 formed in the bottom surface of the copper base lead-frame 49; and a plurality of second weak spot relief holes 59 formed in the overlay of the silver and copper metal portions, the second weak spot relief holes 59 at least partially overlaying the first weak spot relief holes 53.

The copper base lead-frame 49 may be a rectangular shape. The plurality of first and second weak spot relief holes 53, 59 may be configured and spaced to form a plurality of horizontal rows. Alternatively or in combination thereof, the plurality of first and second weak spot relief holes 53, 59 may be configured and spaced to form a plurality of vertical columns.

BRIEF DESCRIPTION OF THE DRAWINGS

A full understanding of the disclosed concept can be gained from the following description of the preferred embodiments when read in conjunction with the accompanying drawings in which.

DETAILED DESCRIPTION OF PREFERRED EMBODIMENTS

Figure 1:
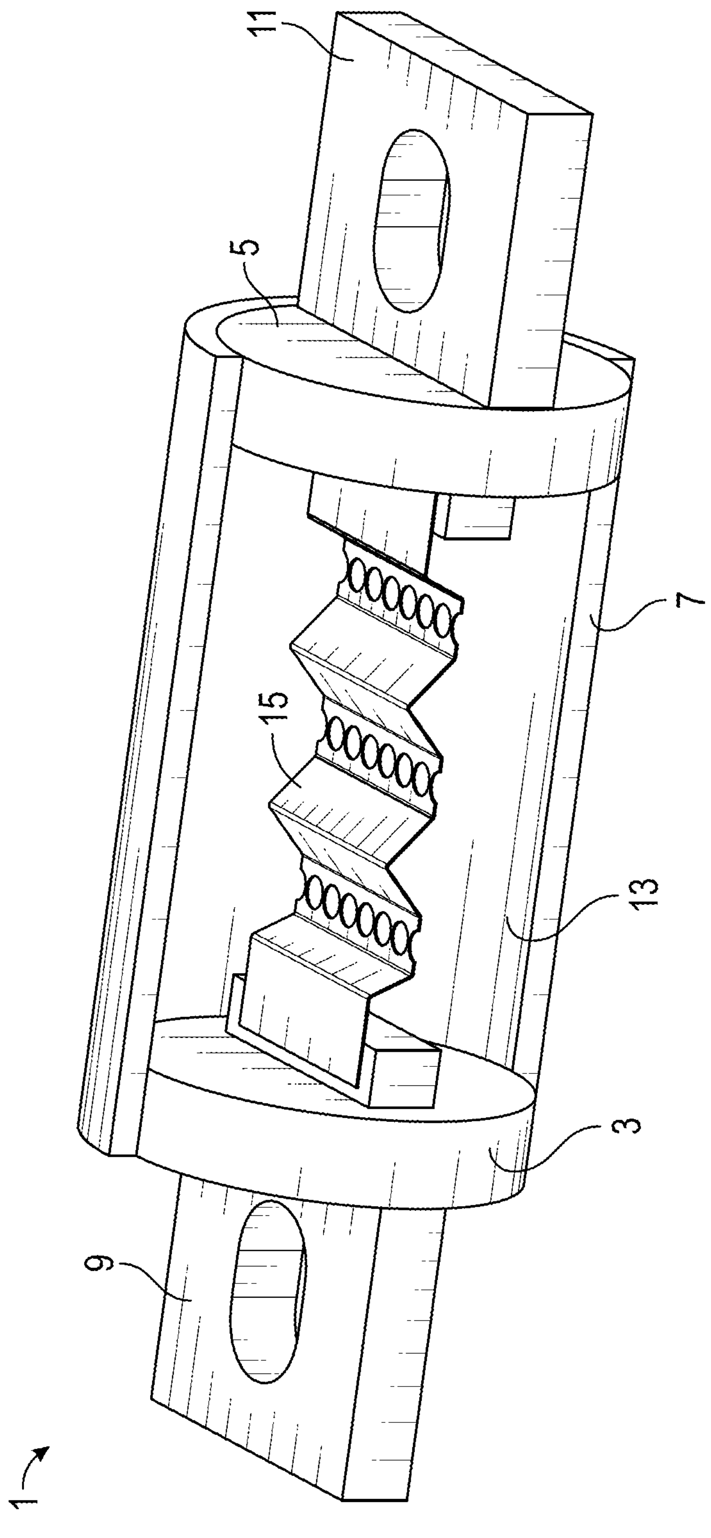
FIG. 1 is a schematic that illustrates a power fuse system 1 construction, in accordance with the prior art.
Figure 2:
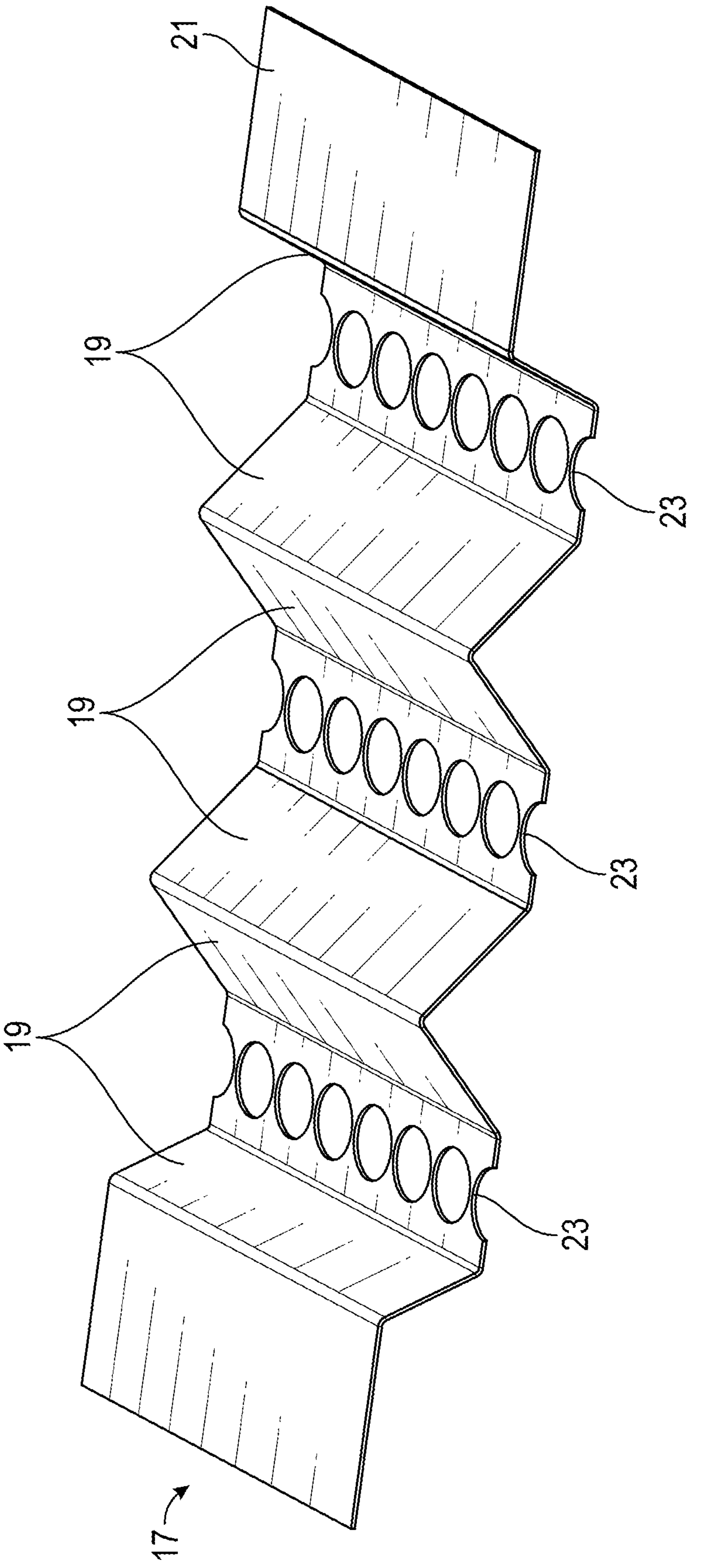
FIG. 2 (Prior Art)
FIG. 2 is a detail view schematic of the fuse element 15 shown in FIG. 1 that illustrates a pure silver metal material 17, in accordance with the prior art.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts. As used herein, the term "number" shall mean one or an integer greater than one (i.e., a plurality).

As used herein, the singular form of "a", "an", and "the" include plural references unless the context clearly dictates otherwise.

The disclosed concept relates to overlay composite fuse elements, constructed of a composite material that includes silver metal and copper metal, and methods of producing and fabricating the composite fuse elements using metal stamping and ultrasonic welding processes. The silver and copper composite material is used to reduce, minimize or combat the high costs associated with traditional pure silver fuse elements and corresponding pure silver metal construction material. In addition, the unique stamping and welding processes for producing the overlay overcomes issues associated with traditional fabrication methods.

Figure 4A:
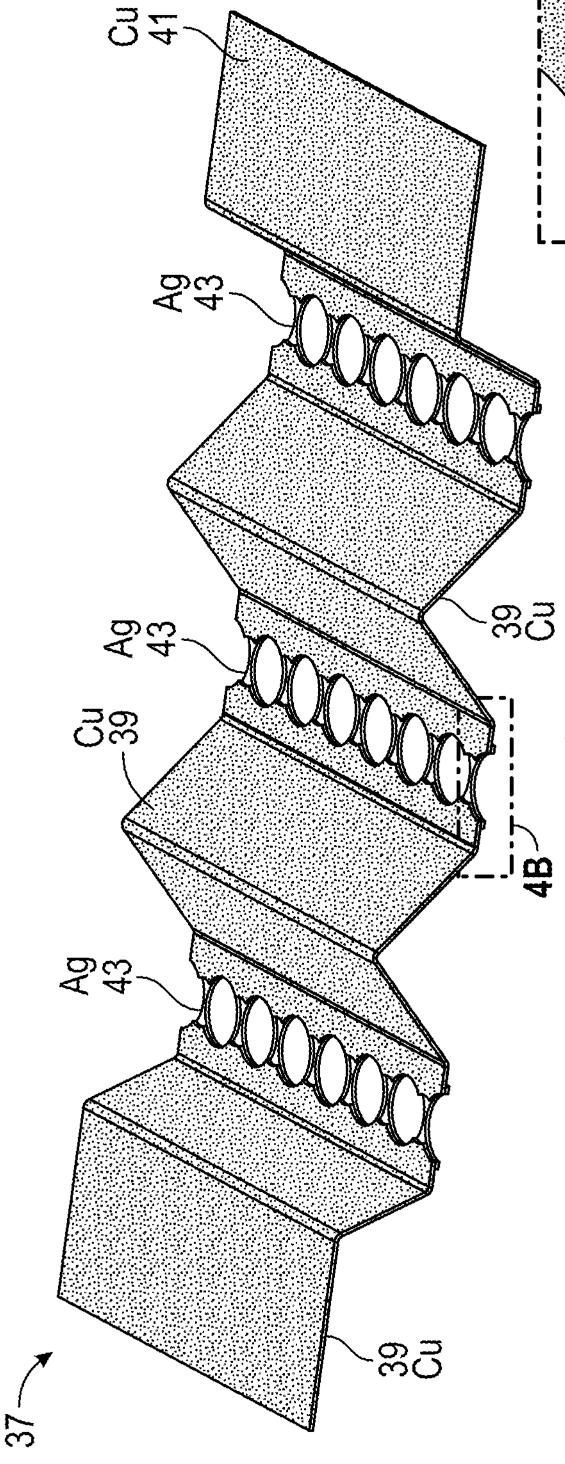
FIG. 4A is a detail view schematic of the fuse element 15 as shown in FIG. 1 that illustrates a silver and copper metal composite material 37.
Figure 4B:
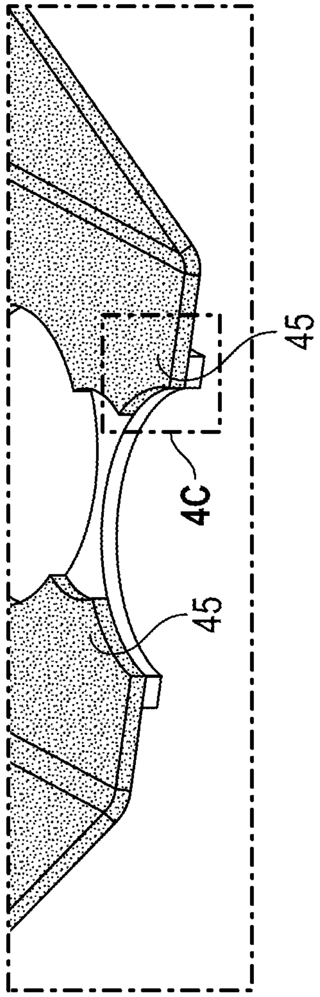
FIGS. 4B and 4C are detail view schematics that illustrate a welded joint surface 45 shown in FIG. 4A, in accordance with certain embodiments of the disclosed concept.
Figure 4C:
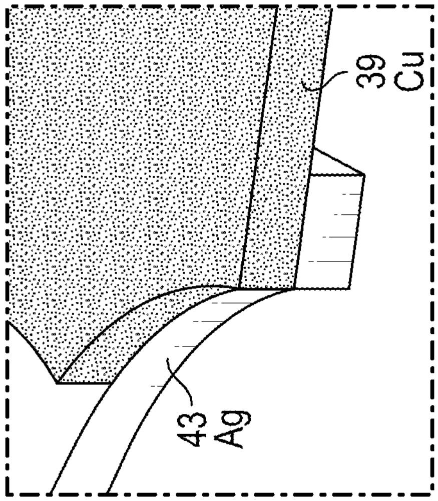

FIG. 4A illustrates a detail view schematic of the fuse element 15 as shown in FIG. 1 wherein the construction includes a composite metal material 37 composed of a silver metal and copper metal composite overlay construction, according to certain embodiments of the disclosed concept. The silver and copper composite metal material 37 includes a plurality of strain absorbing bend features 39 constructed of copper metal, a fuse terminal connection tab 41 constructed of copper metal, and arc interrupting weak-spot features 43 constructed of a silver and copper composite. In certain embodiments, each of the plurality of strain absorbing bend features 39 is constructed of a sheet of copper metal. As shown in FIG. 4A, the bend features 39 are connected to the weak-spot features 43. FIGS. 4B and 4C are detail view schematics of a weld joint wherein the weld joint surface 45 connects a copper portion of the composite to a silver portion of the composite. The weld joint is structured to form an overlay of the copper and silver metal portions on each of the plurality of arc interrupting weak spot features 43, as shown in FIG. 4A.

Figure 3A:
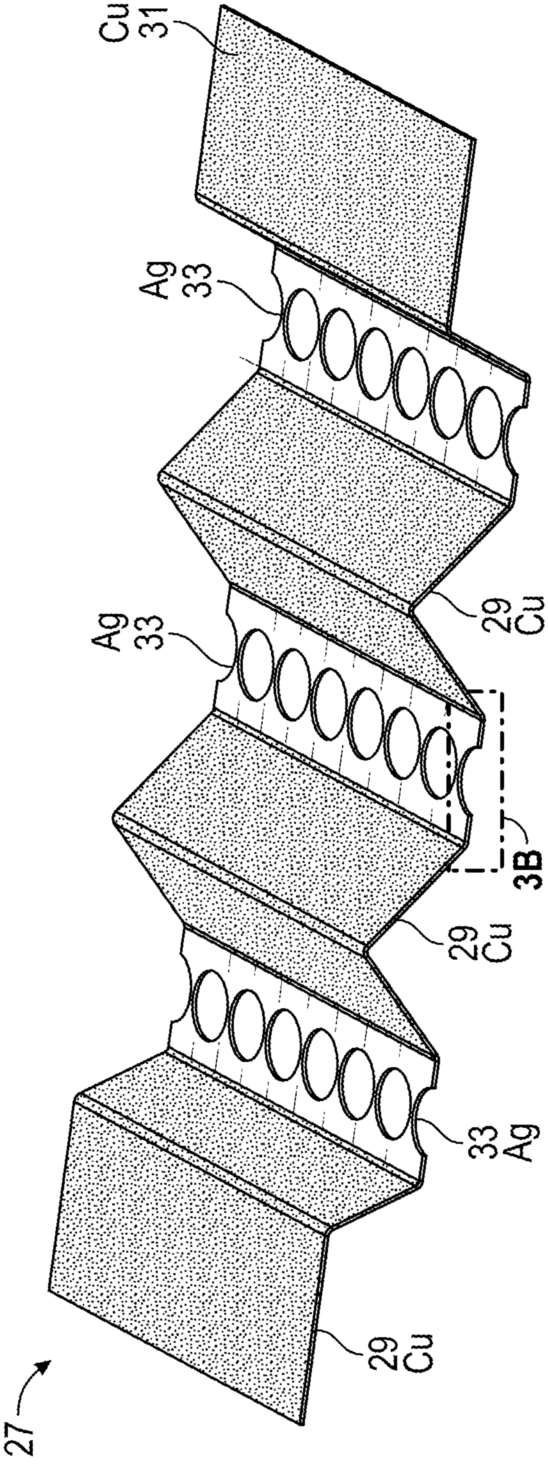
FIG. 3A (Prior Art)
FIG. 3A is a detail view schematic of the fuse element 15 shown in FIG. 1 that illustrates a silver and copper composite metal material 27.

A comparison of the silver and copper composite metal material 37 according to the disclosed concept as shown in FIG. 4A with the prior art silver and copper composite metal material 27 as shown in FIG. 3A, demonstrates that the composite construction according to the disclosed concept has a greater or increased amount of copper (and lesser or reduced amount of silver) as compared to the amount of copper and silver present in the prior art composite metal material 27.

Figure 3B:
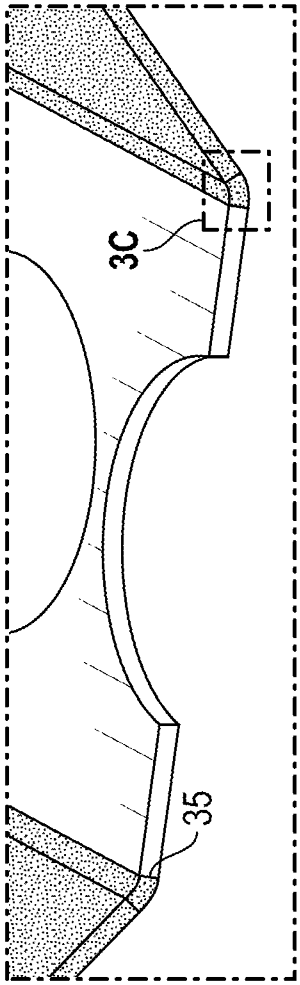
FIG. 3B (Prior Art)
FIGS. 3B and 3C are detail view schematics that illustrate a braised joint 35 shown in FIG. 3A, in accordance with the prior art.
Figure 3C:
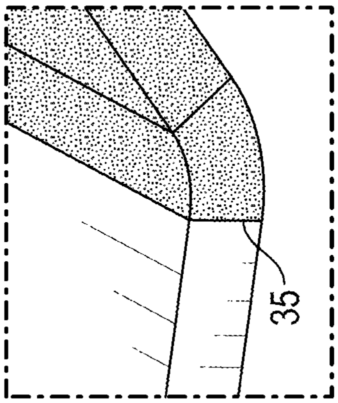
FIG. 3C (Prior Art)

A comparison of the joints (connecting the silver and copper portions) in the prior art and disclosed concept shows that the prior art braised joint 35 is used to join or connect the copper strain absorbing bend features 29 with the silver arc interrupting weak-spot features 33 as shown in FIGS. 3B and 3C, whereas the disclosed concept includes the weld joint surface 45 that is structured to form an overlay of the copper and silver metal portions on each of the plurality of arc interrupting weak spot features 43 (constructed of a silver and copper composite), as shown in FIGS. 4A, 4B and 4C.

Figure 5:
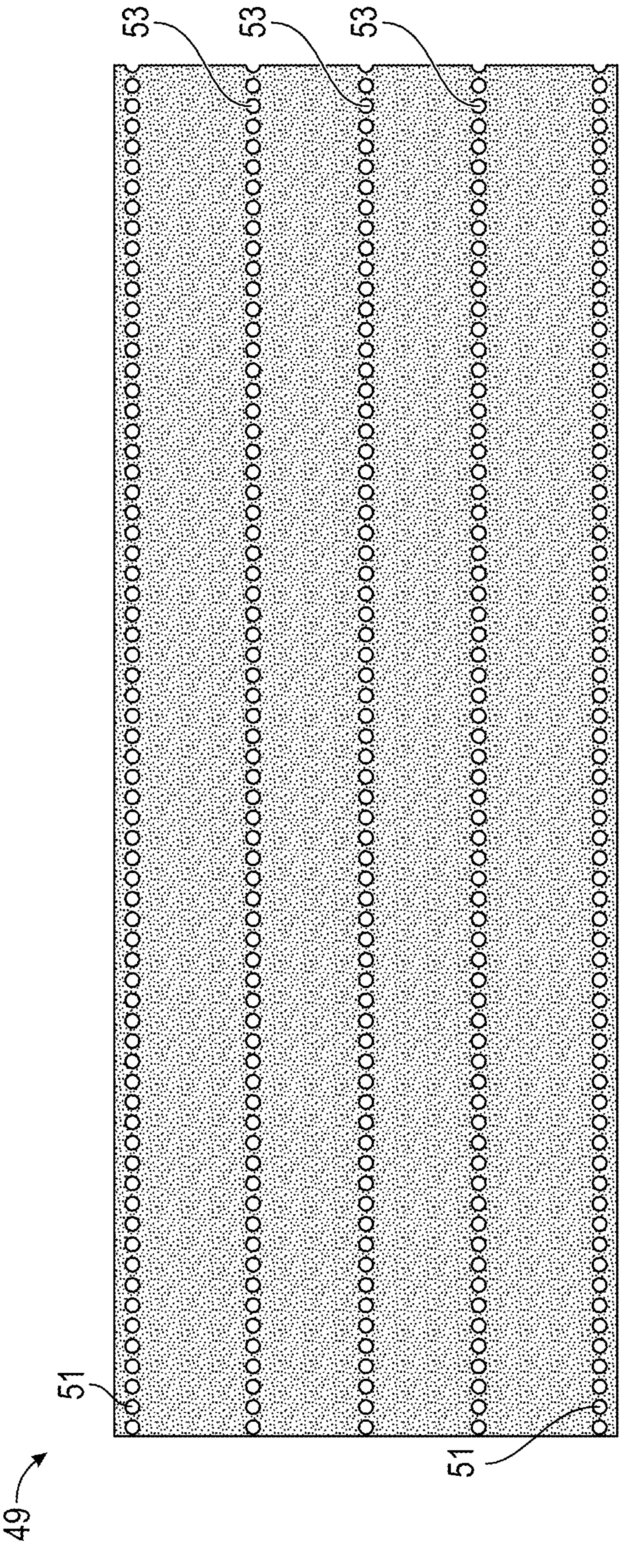
FIG. 5 is a schematic that illustrates a copper base lead-frame 49, in accordance with certain embodiments of the disclosed concept.

In certain embodiments, the silver and copper composite metal material 37 and the arc interrupting weak spot features 43 are produced according to the following processes. As shown in FIG. 5, a copper base lead-frame 49 having a first surface and an opposing second surface, e.g., a top surface and a bottom surface, is obtained and a plurality of initial open through-holes are formed therein, e.g., by punching or puncturing, through the thickness of the copper base lead-frame 49. These initial holes are identified as indexing holes 51 and first weak spot relief holes 53. The size, e.g., length, width and thickness, of the copper base lead-frame 49 can vary, as well as its shape. As shown in FIG. 5, the copper base lead-frame 49 is rectangular. The number and configuration, e.g., pattern and spacing, of the indexing and first weak spot relief holes 51, 53 can also vary. As shown in FIG. 5, these holes are arranged in a plurality of horizontal lines or rows. Alternatively, these holes are arranged in a plurality of vertical lines or columns. The indexing holes 51 are used for placement and guidance of the copper base lead-frame 49 in a machining apparatus, such as a welding apparatus, and the first weak spot relief holes 53 provide a reduced cross-section that is beneficial for handling a fault condition.

Figure 6:
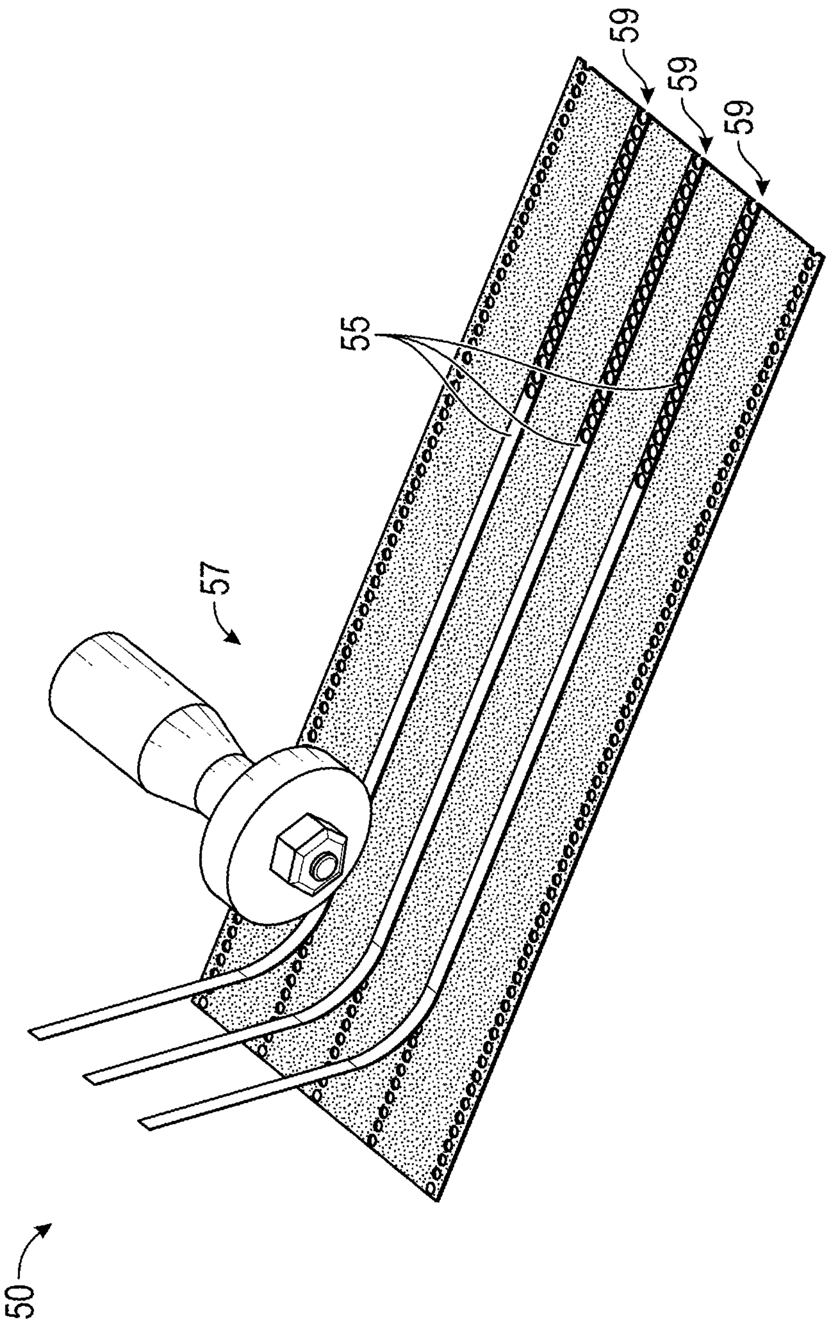
FIG. 6 is a schematic that illustrates silver ribbons 55 welded to a bottom surface 50 of the copper base lead-frame 49 shown in FIG. 5 for covering first weak spot relief holes 53, and addition of second weak spot relief holes 59, in accordance with certain embodiments of the disclosed concept.

As shown in FIG. 6, elongated ribbons 55, e.g., strips, constructed of silver metal, are applied to a bottom surface 50 of the copper base lead-frame 49 onto or over the first weak spot relief holes 53 such as to cover the opening of the holes. In certain embodiments, the silver metal ribbons 55 are welded over the first weak spot relief holes 53. In other embodiments, the silver metal ribbons 55 are applied using resistance spot weld, or laser spot or laser seam welding processes. In addition, solder and brazing processes are used for applying the ribbons 55 over the first weak spot relief holes 53. As shown in FIG. 6, a roller object 57 is used to apply, e.g., by welding, the silver metal ribbons 55, along the horizontal lines, e.g., rows, of the first weak spot relief holes 53. In certain embodiments, the roller object 57 is a rolling ultrasonic weld horn or rolling resistance weld electrode. After applying, e.g., welding, the silver metal ribbons 55, indexed stamping of weak spots is performed. This process includes forming second weak spot relief holes 59; which includes forming open holes, e.g., by punching or puncturing, through the copper and silver composite formed by the silver metal ribbons 55 overlaying portions of the copper base lead-frame 49.

Figure 7B:
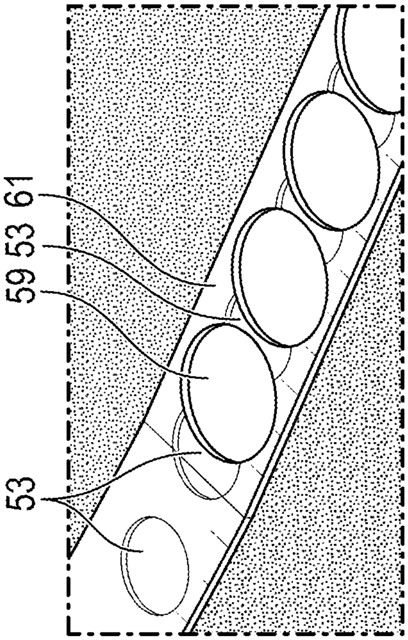
FIG. 7B is a schematic that illustrates a detailed view of the second weak spot relief holes 59 wherein the copper metal sections on either side of the silver ribbons 55 are connected by a silver metal weak spot bridge 61, in accordance with certain embodiments of the disclosed concept.
Figure 7A:
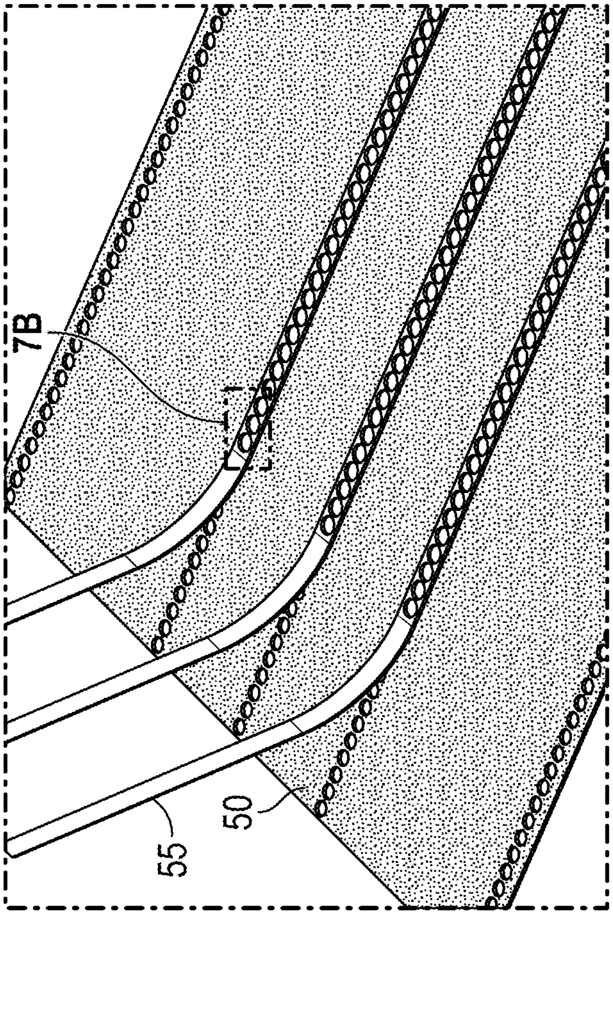
FIG. 7A is a schematic that illustrates a stamping process formed on the bottom surface 50 of the copper base lead-frame 49 with silver ribbons 55 overlaying portions of the copper base lead-frame 49 forming a silver and copper composite.

FIG. 7A shows the elongated silver metal ribbons 55, e.g., strips, applied to the bottom surface 50 of the copper base lead-frame 49, wherein the second weak spot relief holes 59 are formed in the silver metal and copper metal composite that is formed by the silver metal ribbons 55 overlaying portions of the copper base lead-frame 49. FIG. 7B is a detail view of the second weak spot relief holes 59. As shown in FIG. 7B, the second weak spot relief holes 59 overlay portions of the underlying copper base lead-frame 49 and silver ribbons 55, as well as the first weak spot relief holes 53 formed in the copper base lead-frame 49, such that the copper sections on either side of the applied silver metal ribbons 55 are connected by a silver weak spot bridge 61.

Figure 8B:
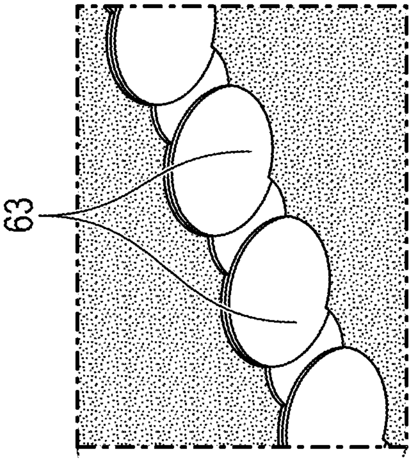
FIG. 8B is a detail view schematic that illustrates final weak spot holes 63, in accordance with certain embodiments of the disclosed concept.
Figure 8A:
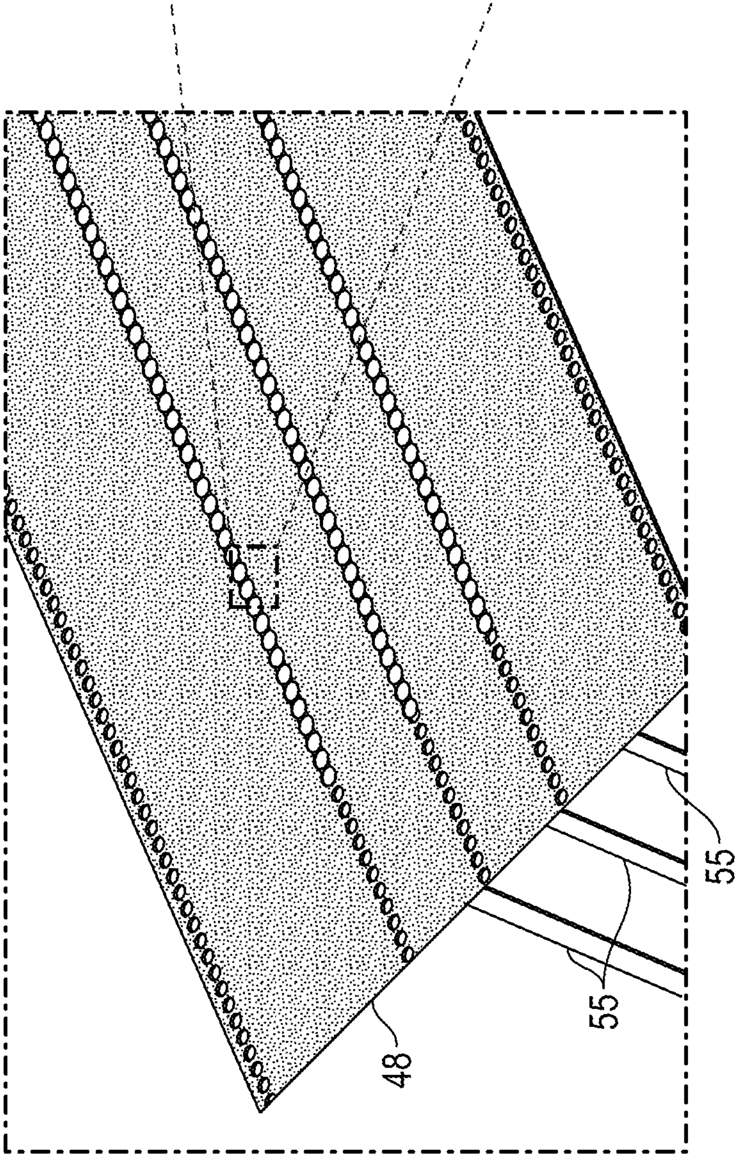
FIG. 8A is a schematic that illustrates a final stamping process on a top surface 48 of the copper base lead-frame 49.

FIG. 8A shows a final stamping process performed on the top surface 48 of the copper base lead-frame 49. A plurality of final weak spot relief holes 63 are formed on the top surface 48 to minimize distortion. FIG. 8B is a detail view schematic that illustrates the final weak spot holes 63.

Figure 9B:
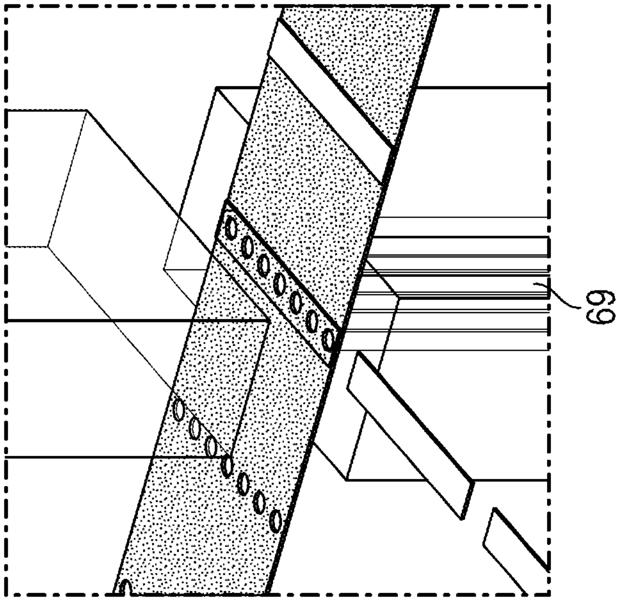
FIG. 9B is a schematic that illustrates a vacuum source 69 structured to hold in place the silver ribbon 55 for welding on the copper base lead-frame 49, in accordance with certain embodiments of the disclosed concept.
Figure 9A:
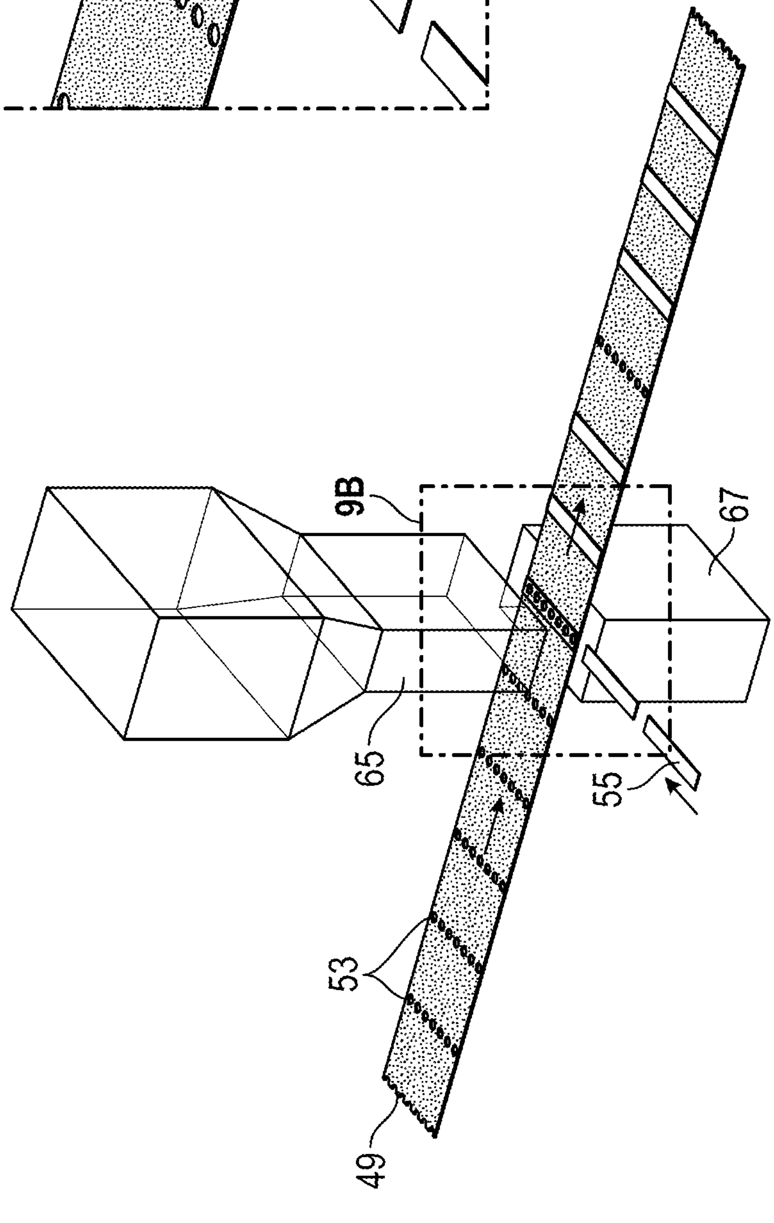
FIG. 9A is a schematic that illustrates an ultrasonic welding process wherein a silver and copper composite overlay lamination is fabricated in an alternate feed direction.

FIG. 9A shows an ultrasonic welding process wherein the composite overlay lamination is fabricated in an alternate feed direction, which results in the plurality of first weak-spot relief holes 53 being vertically formed, e.g., in columns (in contrast to FIG. 5, wherein the first weak-spot relief holes 53 are horizontally formed, e.g., in rows) in the copper base lead-frame 49. As shown in FIG. 9A, the copper base lead-frame 49 is fed in a horizontal direction (e.g., from the left side to the right side in accordance with the black arrows) through an ultrasonic horn 65, while the silver metal ribbon 55 is fed vertically and when positioned on the anvil 67, the horn 65 welds the silver metal ribbon 55 over the first weak-spot relief holes 53 formed in the surface of the copper base lead-frame 49. As shown in FIG. 9B, a vacuum source 69 is structured to hold in place the silver metal ribbon 55 for welding.

Following the welding process shown in FIG. 9A, the silver metal ribbons 55 positioned (welded) on the copper base lead-frame 49 are subjected to a stamping process to form the second weak spot relief holes 59 that overlay portions of the underlying copper base lead-frame 49 and the silver ribbon 55, as well as the first weak spot relief holes 53 formed in the copper base lead-frame 49, such that the copper sections on either side of the applied silver metal ribbon 55 are connected by a silver weak spot bridge 61 (as shown in FIGS. 7A and 7B).

Although the disclosed concept has been described in detail for the purpose of illustration based on what is currently considered to be the most practical and preferred embodiments, it is to be understood that such detail is solely for that purpose and that the disclosed concept is not limited to the disclosed embodiments, but, on the contrary, is intended to cover modifications and equivalent arrangements that are within the spirit and scope of the appended claims. For example, it is to be understood that the present disclosed concept contemplates that, to the extent possible, one or more features of any embodiment can be combined with one or more features of any other embodiment.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

We claim:

1. A method of producing a silver and copper composite overlay fuse element, comprising:

preparing a composite metal material 37 constructed of silver and copper metals, comprising:

forming a plurality of strain absorbing bend features 39 constructed of copper metal; and forming a plurality of arc interrupting weak spot features 43 constructed of a silver metal portion and a copper metal portion, wherein a weld joint forms an overlay of the silver and copper metal portions on each of the plurality of arc interrupting weak spot features 43; and connecting each of the plurality of arc interrupting weak spot features 43 to a corresponding one of the plurality of strain absorbing bend features 39.

2. The method of claim 1, wherein the forming a plurality of arc interrupting weak spot features 43, comprises:

obtaining a copper base lead-frame 49 having a top surface 48 and a bottom surface 50;

forming a plurality of initial open holes comprising indexing holes 51 and first weak spot relief holes 53, through the thickness of the copper base lead-frame 49;

forming a plurality of ribbons 55 constructed of silver;

applying the plurality of ribbons 55 onto the bottom surface of the copper base lead-frame 49 such as to cover the first weak spot relief holes 53; and subsequently forming a plurality of second weak spot relief holes 59 at least partially over the first weak spot relief holes 53.

3. The method of claim 2, wherein applying the plurality of ribbons 55 comprises welding over the first weak spot relief holes 53.

4. The method of claim 3, wherein the welding is selected from ultrasonic welding, resistance spot welding, laser spot welding, and laser seam welding.

5. The method of claim 2, wherein the forming a plurality of second weak spot relief holes 59 comprises forming open holes through a silver and copper composite formed by the plurality of ribbons 55 overlaying portions of the copper base lead-frame 49.

6. The method of claim 2, wherein the forming of the plurality of first weak spot relief holes 53 is conducted by punching or puncturing through the copper base lead-frame 49.

7. The method of claim 5, wherein the forming of a plurality of second weak spot relief holes 59 is conducted by punching or puncturing through the silver and copper composite formed by the ribbons 55 overlaying portions of the copper base lead-frame 49.

8. The method of claim 5, wherein the second weak spot relief holes 59 overlay portions of the copper base lead-frame 49 and the first weak spot relief holes 53.

9. The method of claim 2, wherein a plurality of final weak spot relief holes 63 are subsequently formed in the top surface 48 of the copper base lead-frame to partially overlay portions of the first and second weak spot relief holes 53, 59.

10. A silver and copper composite overlay fuse element, comprising:

a composite metal material 37 constructed of silver and copper metals, comprising:

a plurality of strain absorbing bend features 39 constructed of copper metal; and a plurality of arc interrupting weak spot features 43 constructed of a silver metal portion and a copper metal portion, comprising:

a weld joint surface 45 that is structured to form an overlay of the copper and silver metal portions on each of the plurality of arc interrupting weak spot features 43; and wherein the plurality of arc interrupting weak spot features 43 is connected to a corresponding one of the plurality of strain absorbing bend features 39.

11. The fuse element of claim 10, wherein the plurality of strain absorbing bend features 39 each comprises a sheet of copper metal.

12. The fuse element of claim 10, wherein the plurality of arc interrupting weak spot features 43, comprises:

a copper base lead-frame 49 having a top surface and a bottom surface;

a plurality of first weak spot relief holes 53 formed in the bottom surface of the copper base lead-frame 49; and a plurality of second weak spot relief holes 59 formed in the overlay of the silver and copper metal portions, the second weak spot relief holes 59 at least partially overlaying the first weak spot relief holes 53.

13. The fuse element of claim 12, wherein the copper base lead-frame 49 is a rectangular shape.

14. The fuse element of claim 13, wherein the plurality of first and second weak spot relief holes 53, 59 are configured and spaced to form a plurality of horizontal rows.

15. The fuse element of claim 13, wherein the plurality of first and second weak spot relief holes 53, 59 are configured and spaced to form a plurality of vertical columns.

* * * * *